(12) United States Patent
Polomoff et al.

(10) Patent No.: US 11,543,606 B2
(45) Date of Patent: Jan. 3, 2023

(54) PHOTONICS CHIPS WITH AN EDGE COUPLER AND A CONTINUOUS CRACKSTOP

(71) Applicant: GLOBALFOUNDRIES U.S. Inc., Santa Clara, CA (US)

(72) Inventors: Nicholas A. Polomoff, Hopewell Junction, NY (US); Jae Kyu Cho, Niskayuna, NY (US); Frank Kuechenmeister, Dresden (DE); John J. Ellis-Monaghan, Grand Isle, VT (US); Michal Rakowski, Ballston Lake, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 58 days.

(21) Appl. No.: 17/196,428

(22) Filed: Mar. 9, 2021

(65) Prior Publication Data
US 2022/0291464 A1 Sep. 15, 2022

(51) Int. Cl.
G02B 6/42 (2006.01)
G02B 6/122 (2006.01)
G02B 6/13 (2006.01)
F21V 8/00 (2006.01)

(52) U.S. Cl.
CPC ......... *G02B 6/4298* (2013.01); *G02B 6/0065* (2013.01); *G02B 6/1225* (2013.01); *G02B 6/13* (2013.01)

(58) Field of Classification Search
CPC ...................................................... G02B 6/13
See application file for complete search history.

(56) References Cited

U.S. PATENT DOCUMENTS

| | | | |
|---|---|---|---|
| 8,847,297 B2 | 9/2014 | Kim et al. | |
| 9,606,291 B2 | 3/2017 | Ellis-Monaghan et al. | |
| 9,874,690 B2 * | 1/2018 | Gambino | G02B 6/122 |
| 10,062,748 B1 | 8/2018 | Stamper et al. | |
| 10,230,027 B2 | 3/2019 | Chen | |
| 10,416,380 B1 | 9/2019 | Chen et al. | |
| 10,598,875 B2 | 3/2020 | Xie | |
| 2009/0159119 A1 | 6/2009 | Basol | |

OTHER PUBLICATIONS

R. Dangel et al., "Development of Versatile Polymer Waveguide Flex Technology for Use in Optical Interconnects," in Journal of Lightwave Technology, vol. 31, No. 24, pp. 3915-3926, Dec. 15, 2013.

(Continued)

*Primary Examiner* — Sung H Pak
(74) *Attorney, Agent, or Firm* — Thompson Hine LLP; Anthony Canale

(57) ABSTRACT

Structures including an edge coupler and a crackstop, as well as methods of forming a structure including an edge coupler and a crackstop. A waveguide core and a crackstop are located over a top surface of a dielectric layer. A communication passageway is either optically coupled or electrically coupled to the waveguide core. The communication passageway, which may include an electric conductor or a buried waveguide core, extends laterally beneath the crackstop.

20 Claims, 7 Drawing Sheets

(56) References Cited

OTHER PUBLICATIONS

Lightwave, "Novel wafer-level packaging approaches attract funding" Oct. 1, 2003, retrieved from the internet at https://www.lightwaveonline.com/optical-tech/transmission/article/16649341/novel-waferlevel-packaging-approaches-attract-funding.

Patrick Kennedy, "Lightmatter Mars SoC AI Inference Using Light", Aug. 18, 2020, retrieved from the internet at https://www.servethehome.com/lightmatter-mars-soc-ai-inference-using-light/.

Bill Schweber, "CMOS Plus On-Chip Electro-Optical Interconnect Zooms Past 2 Tb/s", Aug. 19, 2021, retrieved from the internet at https://www.electronicdesign.com/technologies/analog/article/21139195/cmos-plus-onchip-electrooptical-interconnect-zooms-past-2-tbs.

Tymon Barwicz, et al. "Breaking the mold of photonic packaging", Proc. SPIE 10535, Integrated Optics: Devices, Materials, and Technologies XXII, 105350R (Feb. 23, 2018).

Chiles et al., "Multi-planar amorphous silicon photonics with compact interplanar couplers, cross talk mitigation, and low crossing loss", APL Photonics 2, 116101 (2017).

Wim Bogaerts, "Introduction to Silicon Photonics Circuit Design", Optical Fiber Communication Conference 2018.

AyerLabs, "Optical I/O Chiplets Eliminate Bottlenecks to Unleash Innovation", technical brief, 2019.

Carroll L, Lee J-S, Scarcella C, Gradkowski K, Duperron M, Lu H, Zhao Y, Eason C, Morrissey P, Rensing M, Collins S, Hwang HY, O'Brien P. Photonic Packaging: Transforming Silicon Photonic Integrated Circuits into Photonic Devices. Applied Sciences. 2016; 6(12):426.

Polomoff et al., "Crack Detecting and Monitoring System Foran Integrated Circuit", filed Apr. 2, 2020 as U.S. Appl. No. 16/838,439.

\* cited by examiner

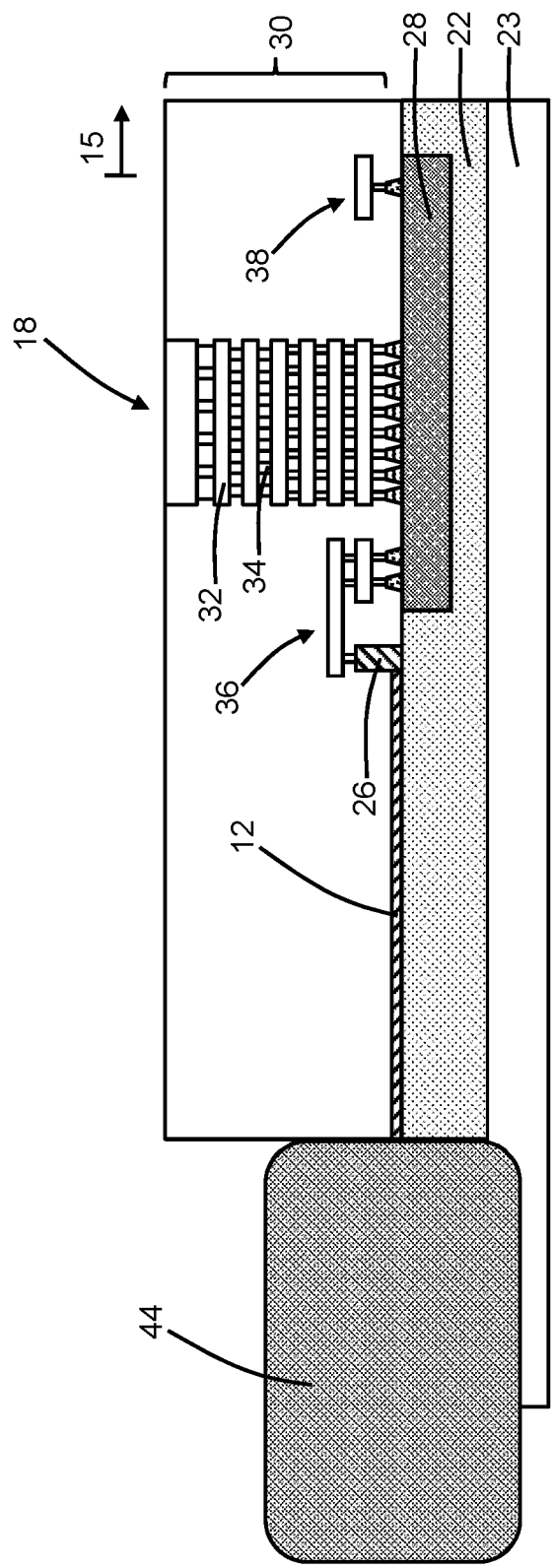

PHOTONICS CHIPS WITH AN EDGE COUPLER AND A CONTINUOUS CRACKSTOP

BACKGROUND

The present invention relates to photonics chips and, more specifically, to structures including an edge coupler and a crackstop, as well as methods of forming a structure including an edge coupler and a crackstop.

Photonics chips are used in many applications and systems such as data communication systems and data computation systems. A photonics chip, also known as a photonics integrated circuit, integrates optical components, such as waveguide cores, polarizers, and optical couplers, and electronic components, such as field-effect transistors, into a unified platform. Among other factors, layout area, cost, and operational overhead may be reduced by the integration of both types of components into the unified platform.

An edge coupler, also known as a spot-size coupler, is commonly used for coupling light of a given mode from an optical fiber to optical components on the photonics chip. The edge coupler may include a waveguide core having an inverse taper adjacent to the optical fiber at the edge of the photonics chip. Corresponding to a direction of mode propagation, an inverse taper refers to a tapered section of a waveguide core characterized by a gradual increase in width along the mode propagation direction. In the edge coupler construction, the narrow end of the inverse taper is arranged proximate to the optical fiber, and the wide end of the inverse taper is connected with another section of the waveguide core that routes the light away from the edge coupler and to optical components in an active region of the photonics chip.

A photonics chip may include a crackstop that is intended to block crack propagation from the corners and edges of the die into the active region. To accommodate the edge coupler, the crackstop must include a discontinuity or break to allow for the passage of the waveguide core and to avoid light attenuation due to the back-end-of-line metallization from which the crackstop is constructed. The break in the crackstop increases the vulnerability of a photonics chip to crack propagation and moisture ingress into the active region, which could lead to catastrophic failure of the chip and its electrical and optical components.

Improved structures including an edge coupler and a crackstop, as well as methods of forming a structure including an edge coupler and a crackstop, are needed.

SUMMARY

In an embodiment of the invention, a structure includes a dielectric layer having a top surface, a waveguide core over the top surface of the dielectric layer, a crackstop over the top surface of the dielectric layer, and a communication passageway coupled to the waveguide core. The communication passageway extends laterally beneath the crackstop.

In an embodiment of the invention, a method includes forming a waveguide core over a top surface of a dielectric layer, forming a crackstop over the top surface of the dielectric layer, and forming a communication passageway coupled to the waveguide core. The communication passageway extends laterally beneath the crackstop.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 2 is a cross-sectional view taken generally along line 2-2 in FIG. 1.

DETAILED DESCRIPTION

Figure 1:
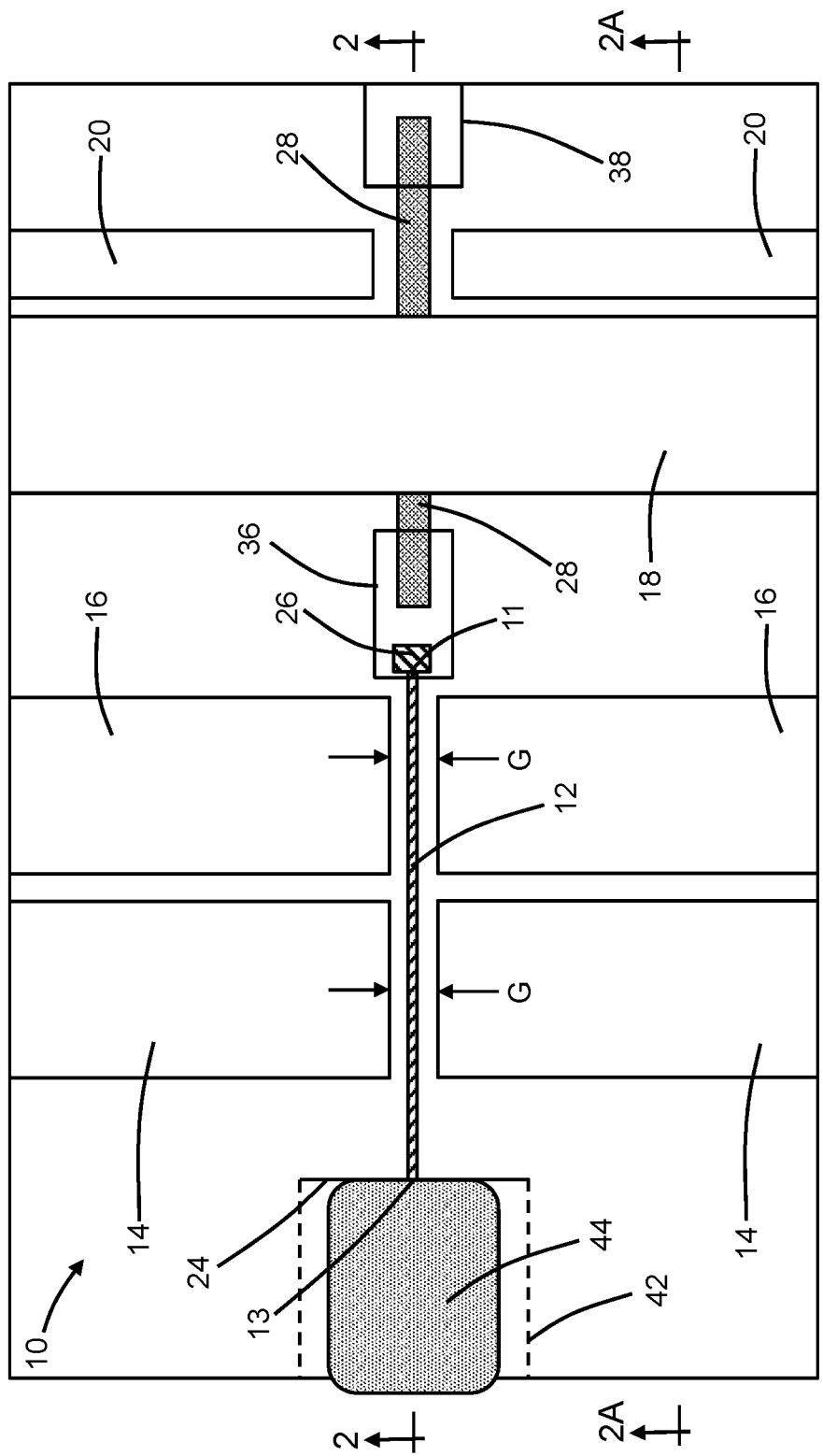
FIG. 1 is a diagrammatic top view of a structure in accordance with embodiments of the invention.
Figure 2A:
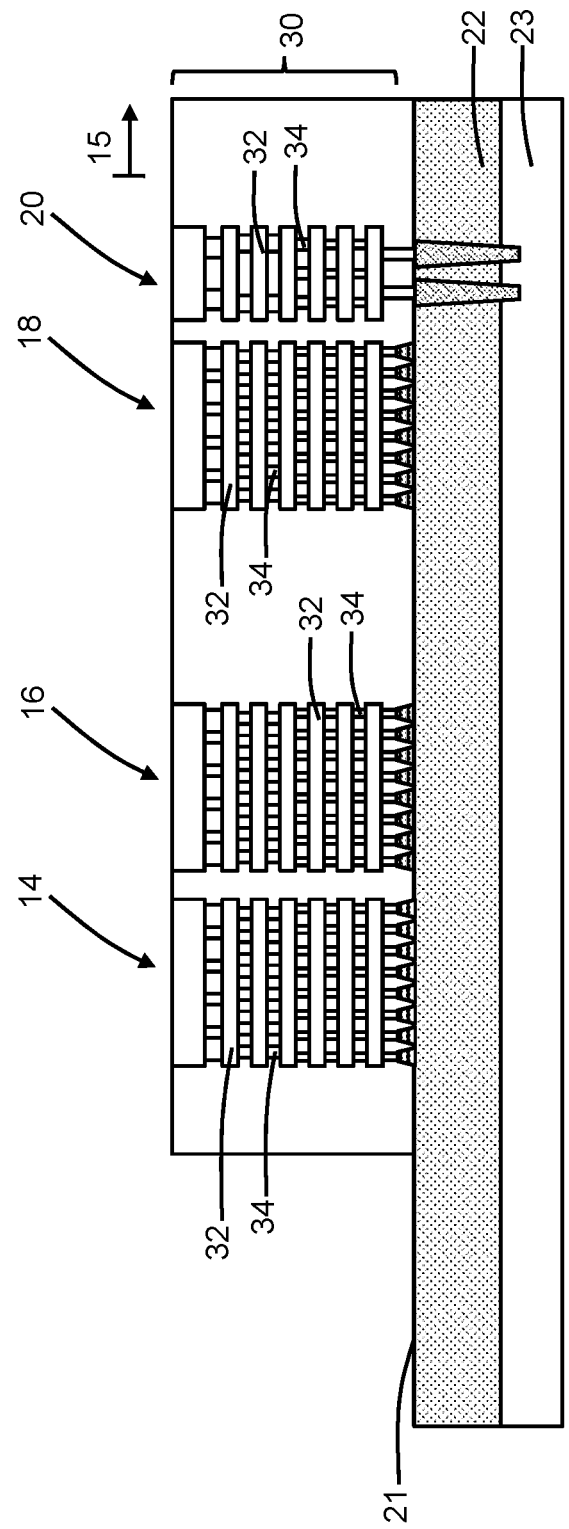
FIG. 2A is a cross-sectional view taken generally along line 2A-2A in FIG. 1.

With reference to FIGS. 1, 2, 2A and in accordance with embodiments of the invention, a structure 10 includes a waveguide core 12 providing an edge coupler, crackstops 14, 16, 18, and a guard ring 20 that are positioned over a top surface 21 of a dielectric layer 22. The waveguide core 12 may terminate at an end surface 13 proximate to an edge 24 of the dielectric layer 22 and may include a tapered section or a metamaterial section adjacent to the end surface 13. The crackstop 14 and the crackstop 16 each include a gap G defining a discontinuity or break through which the waveguide core 12 is routed to a photodetector 26. The structure 10 may be integrated into a photonics chip that includes electronic components and additional optical components situated in an active region 15 that is located interior of the crackstops 14, 16, 18 and guard ring 20.

The waveguide core 12 may be comprised of a single-crystal semiconductor material, such as single-crystal silicon. In an embodiment, the single-crystal semiconductor material may originate from a device layer of a silicon-on-insulator (SOI) substrate that further includes a buried oxide layer providing the dielectric layer 22 and a substrate 23. The dielectric layer 22 may be comprised of a dielectric material, such as silicon dioxide, and the substrate 23 may be comprised of a single-crystal semiconductor material, such as single-crystal silicon. The waveguide core 12 may be patterned from the device layer by lithography and etching processes during front-end-of-line processing.

The photodetector 26 is positioned adjacent to an end surface 11 of the waveguide core 12 that is opposite from the end surface 13 of the waveguide core 12. The photodetector 26, which is optically coupled to the waveguide core 12, converts optical signals received from the waveguide core 12 into an electrical current by the photoelectric effect. The photodetector 26 may be comprised of a semiconductor material with a bandgap selected according to the wavelength of the optical signals. In an embodiment, the photodetector 26 may be comprised of germanium that is epitaxially grown from the single-crystal semiconductor material of the device layer. For example, the photodetector 26 may be formed in a trench patterned in a suitably-dimensioned section of the device layer that is connected to the waveguide core 12.

The structure 10 includes a conductor layer 28 that provides a buried communication channel or passageway extending horizontally beneath the crackstop 16. In an embodiment, the conductor layer 28 may be comprised of a semiconductor material, such as polysilicon, that is positioned in a trench defined in the dielectric layer 22. The semiconductor material of the conductor layer 28 may be deposited by chemical vapor deposition and then etched back to be coplanar with the dielectric layer 22. In an embodiment, the semiconductor layer of the conductor layer 28 may be doped with an n-type dopant (e.g., phosphorus or arsenic) to elevate its electrical conductivity. In an alternative embodiment, the conductor layer 28 may assume a different form dependent on substrate type, technology, etc. The conductor layer 28 extends laterally beneath a portion of the crackstop 18. In an embodiment, the conductor layer 28 may be located fully below the top surface 21 of the dielectric layer 22 and may extend laterally beneath the crackstop 18.

A back-end-of-line stack 30 includes interlayer dielectric layers and metallization arranged in multiple levels over the waveguide core 12 and dielectric layer 22. The crackstops 14, 16, 18, and guard ring 20 are each constructed from a tiered structure including metal lines 32 and bar vias 34 that are stacked in the multiple levels of the back-end-of-line stack 30. In each tiered structure, the bar vias 34 are positioned in a stacked arrangement with the metal lines 32 and connect the metal lines 32 in different levels. The crackstops 14, 16 are positioned horizontally between the photodetector 26 and the edge 24 of the dielectric layer 22, and the crackstop 18 is positioned horizontally between the guard ring 20 and the photodetector 26.

The metal lines 32 and bar vias 34 of the crackstops 14, 16, 18 and guard ring 20 may be formed in the interlayer dielectric layers of the back-end-of-line stack 30 by a damascene process. In that regard, the metal lines 32 and bar vias 34 of the crackstops 14, 16, 18 and guard ring 20 may be comprised of a metal, such as copper and/or aluminum, clad by liner and barrier layers (e.g., tantalum nitride and/or tantalum, or titanium nitride and/or titanium).

The crackstops 14, 16 may surround and extend about the entire outer perimeter of the photonics chip, with the exception of the gaps G in the crackstops 14, 16 defining a passage for the routing of the waveguide core 12 to the photodetector 26. At the location of the respective gaps G, the metal lines 32 and bar vias 34 of the crackstop 14, the metal lines 32 and bar vias 34 of the crackstop 16 are interrupted by respective discontinuities or breaks to provide the gaps G that are free of metallization. In an embodiment, the guard ring 20 may also include a discontinuity or break at the location of the conductor layer 28.

The metal lines 32 and bar vias 34 of the crackstop 18 do not include a discontinuity or break similar to the gaps G in the metal lines 32 and bar vias 34 of the crackstops 14, 16. Instead, the metal lines 32 of the crackstop 18 provide a continuous and unbroken structure that seamlessly extends across the conductor layer 28. The conductor layer 28 provides a buried communication passageway for transferring the photocurrent from the photodetector 26 to the active region 15. In that regard, the metal lines 32 and bar vias 34 in a portion of the crackstop 18 bridge across the conductor layer 28 without interruption. In an embodiment, the conductor layer 28 may extend transverse to the metal lines 32 and/or the bar vias 34 of the crackstop 18.

The back-end-of-line stack 30 includes an electrical connection 36 provided by metal lines 32 and bar vias 34 connecting the photodetector 26 to the conductor layer 28, and an electrical connection 38 provided by metal lines 32 and bar vias 34 connecting the conductor layer 28 to the electrical and optical components in the active region 15. The photocurrent from the photodetector 26, which is generated from the optical signals received via the waveguide core 12, is routed through the electrical connection 36 to the conductor layer 28 and subsequently routed by the electrical connection 36 away from conductor layer 28.

A groove 42 is formed in the substrate 23 adjacent to the edge 24 of the dielectric layer 22. A tip of an optical fiber 44 may be inserted into, and supported at least in part by, a portion of the groove 42 that is adjacent to the end surface 13 of the waveguide core 12. A low-index adhesive may be used to assemble the tip of the optical fiber 44 and may fill all or part of the groove 42. The groove 42 may extend laterally beneath the dielectric layer 22 as an undercut. The groove 42 may be formed by a multiple-step process. In that regard, a rectangular opening may be patterned that extends through the back-end-of-line stack 30 and dielectric layer 22 into the substrate 23. The formation of the rectangular opening may define the edge 24 of the dielectric layer 22. The patterning may also form holes (not shown) extending through the back-end-of-line stack 30 and dielectric layer 22 into the substrate 23 adjacent to a portion of the waveguide core 12 near the end surface 13. The rectangular opening in the substrate 23 may then be masked with a resist, and the substrate 23 beneath the portion of the waveguide core 12 may be etched through the holes by an etching process using, for example, a sulfur hexafluoride plasma to provide an initial undercut. After removing the resist, a wet chemical etchant characterized by etch rates dependent upon crystalline direction may be used to shape the groove 42 with a V-shape or U-shape.

Figure 5:
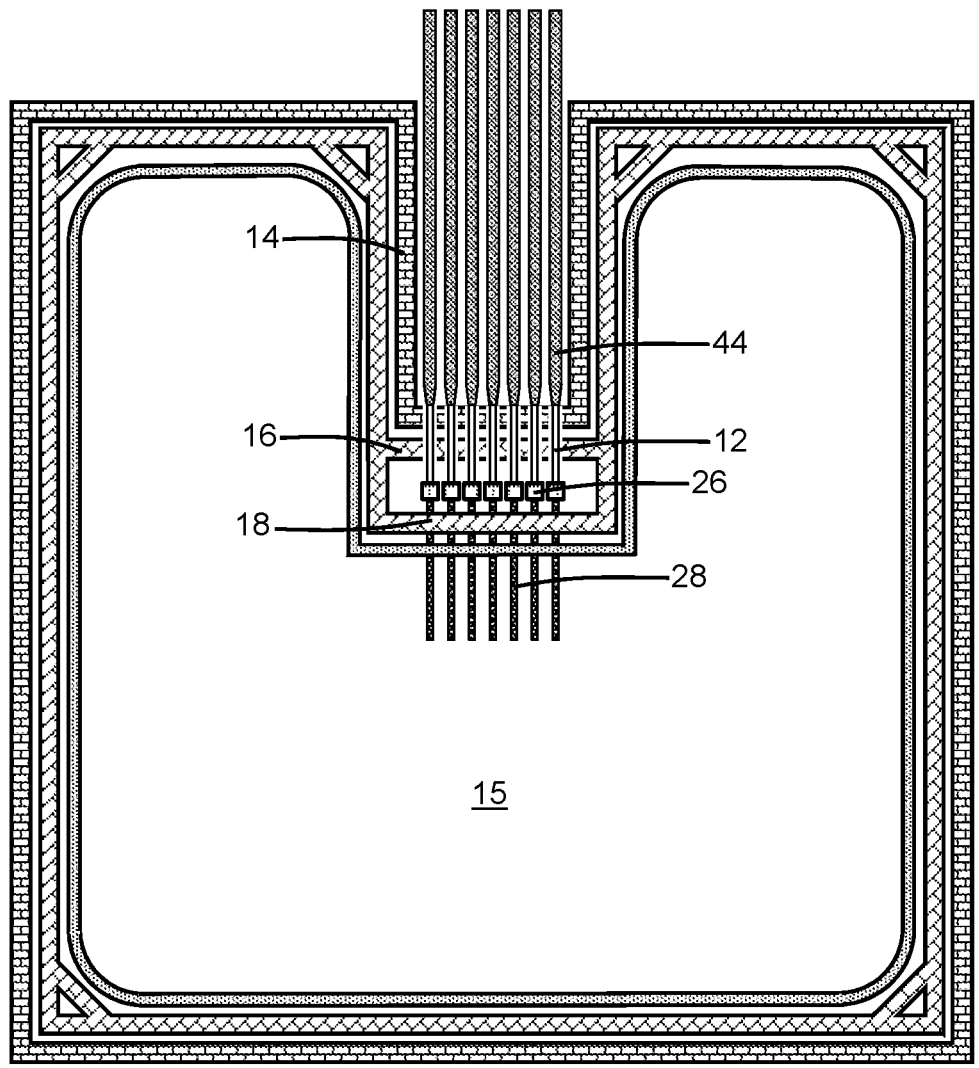
FIG. 5 is a diagrammatic top view of a chip structure in accordance with embodiments of the invention.

In an alternative embodiment, the structure 10 may be replicated to interface with additional optical fibers 44 as shown in FIG. 5. In an alternative embodiment, the metal lines 32 and bar vias 34 of the guard ring 20 may extend across the conductor layer 28 to provide continuity for the guard ring 20.

In use, the structure 10 including the photodetector 26 and conductor layer 28 permits optical signals to be transmitted from the waveguide core 12 into the active region 15 absent a break in the crackstop 18. The photodetector 26 converts the optical signals received from the waveguide core 12 into a photocurrent, which is routed as an electrical current by the conductor layer 28 and electrical connections 36, 38 to the active region 15.

Because the conductor layer 28 extends laterally as a communication passageway beneath the crackstop 18, the crackstop 18 can be continuous and unbroken, which reduces the vulnerability of the photonics chip to crack propagation and moisture ingress into the active region 15 while permitting optical signals to be effectively communicated into the active region 15. The crackstop 18 creates a hermetic seal that extends fully around the active region 15, as best shown in FIG. 5, and separates the active region 15 from the optical assembly including the waveguide core 12 and optical fiber 44.

Figure 3:
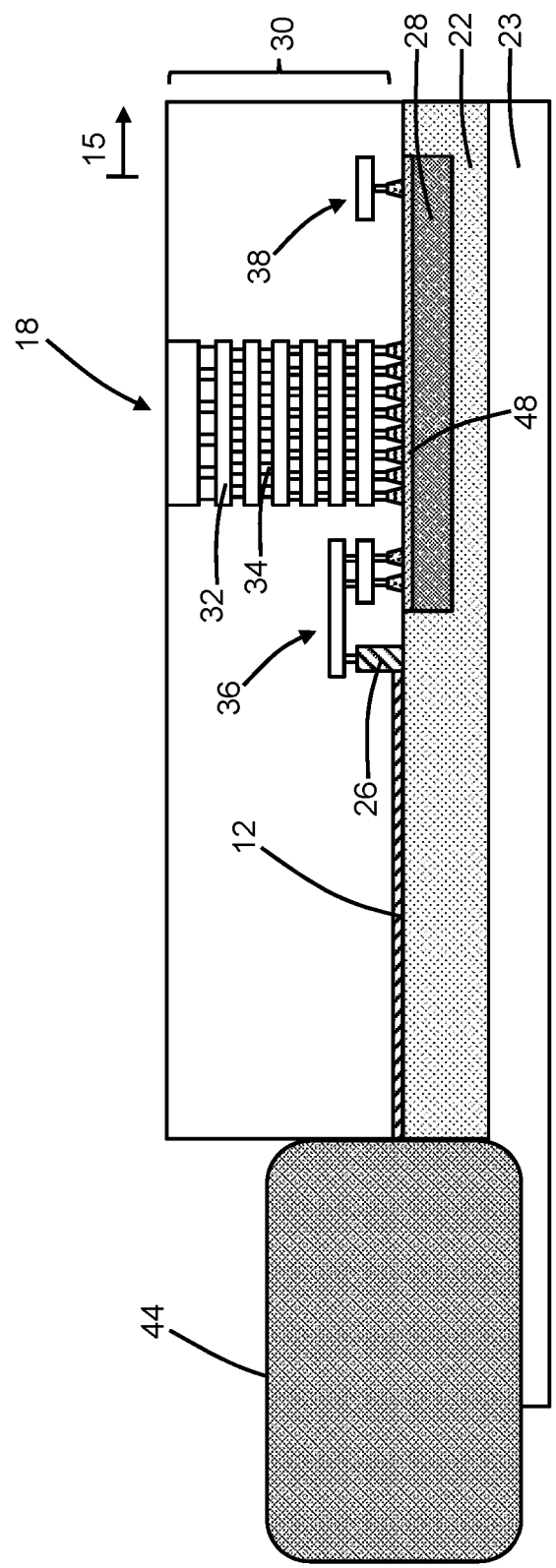
FIG. 3 is a cross-sectional view of a structure in accordance with alternative embodiments of the invention.

With reference to FIG. 3 and in accordance with alternative embodiments of the invention, a silicide layer 48 may be formed on the conductor layer 28 before the back-end-of-line stack 30 is formed. The conductor layer 28 and silicide layer 48 extend laterally as a communication passageway beneath the crackstop 18. The silicide layer 48 may be formed on the conductor layer 28 by a silicidation process involving the deposition of a layer of a silicide-forming metal by, for example, chemical vapor deposition or physical vapor deposition, followed by one or more annealing steps (e.g., rapid thermal annealing). The annealing steps form a silicide phase by causing the layer of silicide-forming metal to react with the contacted semiconductor material of the conductor layer 28. Residual silicide-forming metal remaining after forming the silicide layer 48 may be removed by wet chemical etching. The silicidation reaction can be limited by, for example, limiting the thickness of the deposited layer of silicide-forming metal that is available to react with the semiconductor material of the conductor layer 28. In embodiments, the silicide-forming metal may comprise nickel, cobalt, or another metal capable of reacting with silicon to form a low-resistivity, thermally-stable silicide as a result of the silicidation process.

Figure 4:
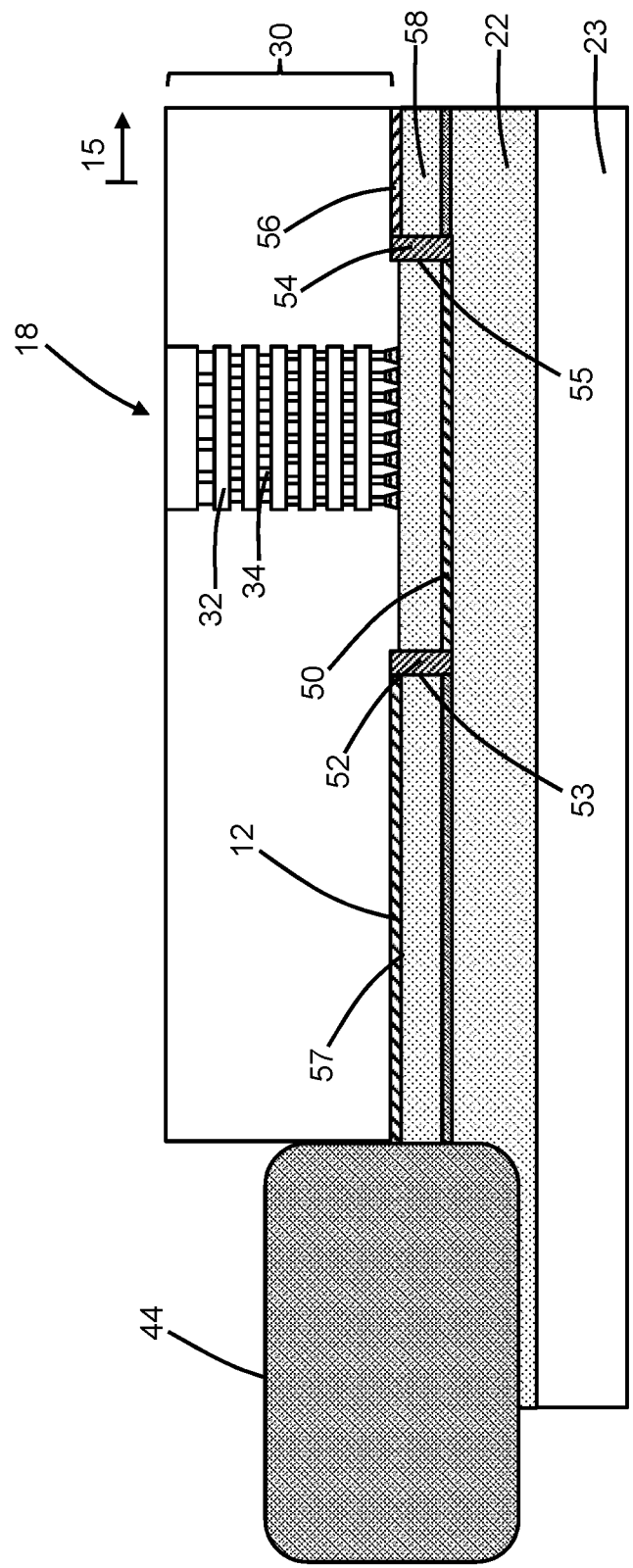
FIG. 4 is a cross-sectional view of a structure in accordance with alternative embodiments of the invention.

With reference to FIG. 4 and in accordance with alternative embodiments of the invention, a buried waveguide core 50 may replace the conductor layer 28 as the buried communication passageway in the structure 10. An optical coupler 52 may be used to transfer the optical signals from the waveguide core 12 to the buried waveguide core 50. The optical coupler 52 is configured to optically couple the waveguide core 12 to the buried waveguide core 50. Another optical coupler 54 may be used to transfer the optical signals from the buried waveguide core 50 to a bus waveguide core 56 routing the optical signals into the active region 15. The optical coupler 54 is configured to optically couple the buried waveguide core 50 to the bus waveguide core 56.

The buried waveguide core 50 extends as a communication passageway laterally beneath the crackstop 18. A dielectric layer 58, which may be comprised of silicon dioxide, may be positioned between the crackstop 18 and the buried waveguide core 50. In an embodiment, the buried waveguide core 50 may be located fully below a top surface 57 of the dielectric layer 58 and may extend laterally beneath the crackstop 18. The waveguide core 12 and the crackstop 18 are located over the top surface 57 of the dielectric layer 58.

The buried waveguide core 50 may be formed by a wafer bonding technique in which the buried waveguide core 50 is formed on one substrate that is subsequently joined to another substrate by, for example, oxide bonding. The optical couplers 52, 54 may be formed by patterning openings 53, 55 penetrating through the dielectric layer 58 and at least partially filling the openings 53, 55 with a material (e.g., silicon or silicon nitride) characterized by a refractive index contrast with the material of the dielectric layer 58. The optical couplers 52, 54 may be respectively located adjacent to the opposite ends of the buried waveguide core 50. The optical couplers 52, 54 provide light confinement for the vertical transfer of optical signals in conjunction with the surrounding lower index material provided by the dielectric layer 58.

In use, the structure 10 including the buried waveguide core 50 and optical couplers 52, 54 may be used to transmit optical signals from the waveguide core 12 into the active region 15. In addition, the structure 10 including the buried waveguide core 50 and optical couplers 52, 54 may be used in reverse to transmit optical signals from the active region 15 to the waveguide core 12 and off the photonics chip. The dielectric layer 22 provides low-index cladding that mitigates light attenuation due to the metal lines 32 and bar vias 34 from which the crackstop 18 is constructed.

Because the buried waveguide core 50 extends as a communication passageway laterally beneath the crackstop 18, the crackstop 18 can be continuous and unbroken, which reduces the vulnerability of the photonics chip to crack propagation and moisture ingress into the active region 15 while permitting optical signals to be effectively communicated into, and possibly out of, the active region 15. The crackstop 18 creates a hermetic seal that extends fully around the active region 15, as best shown in FIG. 6, and separates the active region 15 from the optical assembly including the waveguide core 12 and optical fiber 44.

With reference to FIG. 5 and in accordance with alternative embodiments of the invention, multiple instances of the structure 10 may be used to convert optical signals from multiple waveguide cores 12 and optical fibers 44 into photocurrents for individual routing into the active region 15. Each instance of the structure 10 may include the photodetector 26 and conductor layer 28, as well as a separate set of electrical connections 36, 38, to accomplish the routing via an independent communication passageway into the active region 15.

Figure 6:
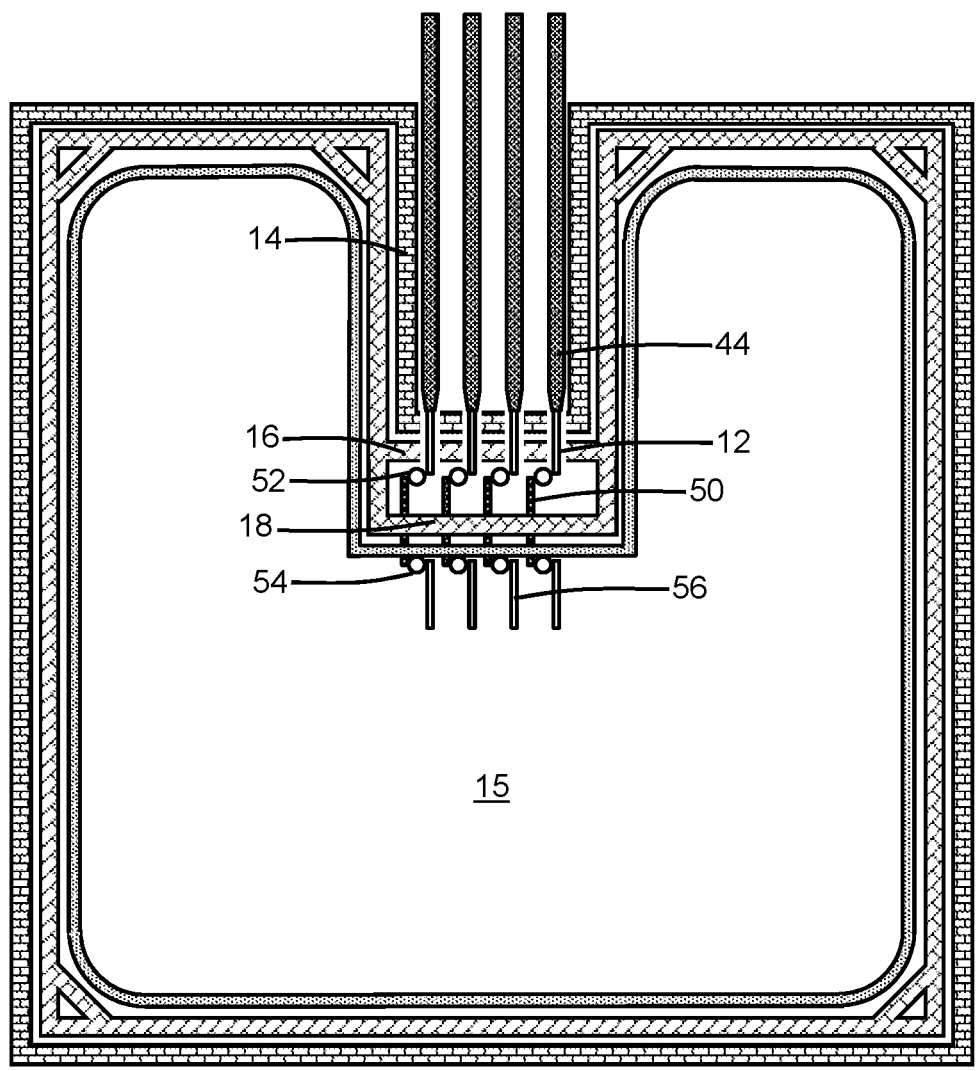
FIG. 6 is a diagrammatic top view of a chip structure in accordance with embodiments of the invention.

With reference to FIG. 6 and in accordance with alternative embodiments of the invention, multiple instances of the structure 10 may be used to transfer optical signals from multiple waveguide cores 12 and optical fibers 44 to multiple bus waveguide cores 56 for routing into the active region 15. Each instance of the structure 10 may include the buried waveguide core 50 and optical couplers 52, 54 that connect one of the waveguide cores 12 with one of the bus waveguide cores 56 to provide an independent communication passageway.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a dielectric layer having a top surface;
   a first waveguide core and a second waveguide core over the top surface of the dielectric layer;
   a crackstop over the top surface of the dielectric layer; and
   a communication passageway comprising a third waveguide core that is positioned under the dielectric layer, the communication passageway extending laterally beneath the crackstop;
   a first optical coupler optically coupling the first waveguide core to the second waveguide core, the first optical coupler extending from the first waveguide core through the dielectric layer to the second waveguide core; and
   a second optical coupler optically coupling the second waveguide core to the third waveguide core, the second optical coupler extending from the second waveguide core through the dielectric layer to the third waveguide core.

2. A structure comprising:
   a dielectric layer having a top surface;
   a waveguide core over the top surface of the dielectric layer;
   a photodetector optically coupled to the waveguide core;
   a back-end-of-line stack over the dielectric layer;
   a crackstop over the top surface of the dielectric layer, the crackstop arranged in the back-end-of-line stack; and
   a communication passageway coupled to the waveguide core, the communication passageway comprising a conductor layer extending laterally beneath the crackstop,
   wherein the back-end-of-line stack includes an electrical connection coupling the photodetector to the conductor layer.

3. The structure of claim 2 wherein the conductor layer comprises doped polysilicon.

4. The structure of claim 2 wherein the conductor layer comprises a silicide.

5. The structure of claim 1 wherein the crackstop includes a plurality of metal lines and a plurality of bar vias in a stacked arrangement with the plurality of metal lines, and the plurality of metal lines extend across the communication passageway.

6. The structure of claim 1 wherein the dielectric layer has an edge, and the first waveguide core has an end surface positioned adjacent to the edge of the dielectric layer.

7. The structure of claim 6 further comprising:
   a substrate including a groove adjacent to the edge of the dielectric layer.

8. The structure of claim 7 further comprising:
   an optical fiber including a tip positioned in the groove adjacent to the end surface of the first waveguide core.

9. A method comprising:
   forming a waveguide core over a top surface of a dielectric layer;
   forming a photodetector optically coupled to the waveguide core;
   forming a back-end-of-line stack over the dielectric layer;
   forming a crackstop over the top surface of the dielectric layer; and
   forming a communication passageway coupled to the waveguide core,
   wherein the communication passageway extends laterally beneath the crackstop, the crackstop is arranged in the back-end-of-line stack, the communication passageway is a conductor layer, and the back-end-of-line stack includes an electrical connection coupling the photodetector to the conductor layer.

10. The structure of claim 2 wherein the crackstop includes a plurality of metal lines and a plurality of bar vias in a stacked arrangement with the plurality of metal lines, and the plurality of metal lines extend across the communication passageway.

11. The structure of claim 2 wherein the dielectric layer has an edge, and the waveguide core has an end surface positioned adjacent to the edge of the dielectric layer.

12. The structure of claim 11 further comprising:
    a substrate including a groove adjacent to the edge of the dielectric layer.

13. The structure of claim 12 further comprising:
    an optical fiber including a tip positioned in the groove adjacent to the end surface of the waveguide core.

14. The structure of claim 2 further comprising:
    a guard ring,
    wherein the crackstop is horizontally positioned between the guard ring and the photodetector.

15. The structure of claim 2 wherein the dielectric layer has an edge, and further comprising:
    a guard ring,
    wherein the crackstop is horizontally positioned between the photodetector and the edge of the dielectric layer.

16. The structure of claim 2 wherein the photodetector comprises germanium.

17. The structure of claim 2 wherein the dielectric layer includes a trench, and the conductor layer is positioned in the trench.

18. The structure of claim 17 wherein the conductor layer is located fully below the top surface of the dielectric layer.

19. The structure of claim 17 wherein the conductor layer is coplanar with the top surface of the dielectric layer.

20. The structure of claim 1 wherein the dielectric layer comprises a dielectric material, the first optical coupler comprises a first opening in the dielectric layer and a first material in the first opening, the second optical coupler comprises a second opening in the dielectric layer and a second material in the second opening, and the first material and the second material have an a refractive index contrast with the dielectric material of the dielectric layer.

* * * * *